No. 793,615.

Patented June 27, 1905.

UNITED STATES PATENT OFFICE.

DANIEL F. SHERMAN, OF CHICAGO, ILLINOIS, ASSIGNOR, BY DIRECT AND MESNE ASSIGNMENTS, TO CALIFORNIA CONCENTRATED FRUIT COMPANY, A CORPORATION OF CALIFORNIA.

PRESERVED-FRUIT PRODUCT.

SPECIFICATION forming part of Letters Patent No. 793,615, dated June 27, 1905.

Application filed September 20, 1901. Renewed March 7, 1905. Serial No. 248,938.

*To all whom it may concern:*

Be it known that I, DANIEL F. SHERMAN, a citizen of the United States, residing at Chicago, in the county of Cook and State of Illinois, have invented a certain new and Improved Preserved-Fruit Product, of which the following is a specification.

Preserved fruits are of two general types or classes, dried and canned, and in either mode or method of preservation the product or article is open to objections on various grounds. Dried fruit will keep under certain conditions for a long period of time if protected against insects and atmospheric conditions; but dried fruit in being dried changes in flavor and loses other natural properties of the fruit. Canned fruit, while retaining the flavor and natural properties to a certain extent, according to the method of canning, has to be prepared by boiling down in order to be used in the making of certain pastry, confections, jams, and other delicacies which require less moisture than the canned or fresh fruit contains. Neither dried nor canned fruit, therefore, meet all the conditions and requirements of a choice article having the properties and capable of being used the same as cooked fresh fruit.

The object of this invention is the production of fruit in a preserved condition or stated form, having the various objections to dried and canned fruit removed and which will retain the color, flavor, and all the properties of fresh fruit when cooked and can be used under the same conditions and with the same effect for pastries and delicacies as cooked fresh fruit; and to this end the invention consists, as a new article of manufacture, of a concentrated and solidified preserved-fruit product made from the fiber and juice solids put up under conditions and environments by a treatment *in vacuo* through which the color, flavor, and all the natural properties of the fresh fruit practically will be retained and found in the product and which will dissolve quickly, is digestible, and is distinctly compact, non-elastic, and comparatively impervious to atmospheric moisture, as hereinafter described and claimed.

The finished product or new article of preserved fruit is the resultant of fruit first reduced into the shape of fine pulp, or, in other words, the pulp of the fruit, by which is meant the fine fiber and juice solids separated, preferably, from the skins and coarser fiber.

The new product or new article of preserved fruit of the present invention in one form of production is obtained as follows: The fruit is first washed to remove all foreign substances and impurities, and after washing, for fruits like apples and pears, the cores can be removed or not before pulping and submitting to the treatment for the complete product. With pitted fruit, such as peaches, plums, &c., the pits are to be removed before proceeding with the pulping and subsequent treatment for the product. With berries the stems and hulls can be removed after washing and before pulping or they can be left on for removal after pulping and before the subsequent treatment for the product. The fruit, if washed and cored and pitted or stemmed and hulled, is ground, crushed, or mashed and reduced to a mash or mastic condition. With the cores and skins not removed from the fruit and with the stems and hulls not removed from the berries the grinding, crushing, or mashing can include all parts of the fruit. The mash or mastic is run through a suitable separator or pulper, which may be a wire-netting or perforated sheet metal in the form of a sieve or screen, so as to separate the fine pulp, consisting of the fiber and juice solids, from the other coarser material. This fine pulp is placed, preferably, in a vacuum pan or kettle and there subjected to treatment under a temperature below the boiling-point, by which the mass of pulp will be cooked and concentrated and brought to a thick pasty condition.

The pulp is subjected to a treatment in the vacuum pan or kettle to retain therein the original and natural flavors and properties of the fruit, and for this purpose the following mode of operation is preferred: The vacuum-pump is first started, and when the gage registers fifteen points, approximately, the pulp is drawn into the vacuum pan or kettle by suction, and in admitting the pulp care should be taken not to allow the vacuum to fall below ten points, and in the event of the registration of a lower point than ten the filling should be continued less rapidly. The agitator should be started when the vacuum-gage registers eighteen points, at which time also the steam should be turned on or admitted to the vacuum pan or kettle. The vacuum-gage during the operation of agitating under the heat of the steam should not be allowed to fall below eighteen points and should be maintained approximately at twenty points until the mastic pulp in the pan or kettle begins to thicken, and when the required thickening or reduction to a plastic condition is reached the action of the steam need not proceed further, as the resultant is then ready to be drawn off from the vacuum pan or kettle. During the treatment of the mass within the vacuum pan or kettle the thermometer will gradually rise from a temperature of 140° to 180° Fahrenheit, and preferably the temperature during the treatment within the vacuum pan or kettle should be a medium one of approximately 160°, at which point or between the temperature of 140° to 180° Fahrenheit the mass begins to thicken, and with the further proceeding of concentrating or thickening the vacuum gradually rises to twenty-six and one-fourth and the thermometer falls to about 135° Fahrenheit, and when these two conditions of vacuum and temperature are reached the product is brought to a condition for removal from the pan, so as to be in a solidified, coherent, and compact plastic condition, so that when removed and submitted to a final drying the moisture will be eliminated to a point below that at which fermentation would take place, rendering the product fermentation-proof both as to organized or yeast ferments and unorganized or chemical ferments, the latter of which with fresh fruit in the event of injury of the cells or exposure of the fruit to the air will in a very short time oxidize and modify the color, flavor, and aroma of the fruit.

The solidified and coherent plastic product which is the resultant of the treatment in the vacuum pan or kettle under the conditions specified can be discharged into suitable pans or trays or other receptacles or onto a traveling apron or belt. The finished product may have the shape of a rectangular block or brick or the shape of a sheet or slab or other suitable shape. The product can be wrapped, closured, and placed on a truck or other conveyance to be carried away for packing or being cared for otherwise. The product if not in the proper condition as regards the moisture contained therein can be placed in the drying-room or other suitable appliance for drying out any excess of moisture there may be, so as to bring the product into proper condition for any moisture retained therein to be below the point where fermentation would take place, it being especially desirable to have the product fermentation-proof against the action of ferments for keeping purposes. When sufficiently dry or with the moisture eliminated, so as to render the product fermentation-proof, the product can be wrapped and packed in suitable boxes, and in packing it is preferred to pack the product in layers, one on top of the other, a sheet of paper or a piece of cloth being placed between each individual product, forming a wrapper or closure therefor.

The fruit at some stage or other in the treatment of the product is preferably to be subjected to a treatment that will prevent decolorization, which treatment is by means of harmless chemicals in solution or the fumes of harmless chemicals, and for this purpose sulfur is a proper agent. The treatment of berries and of some fruits which are exceedingly soft can be proceeded with in the vacuum pan or kettle without a first reduction to a mashed or mastic condition, as the treatment for the plastic resultant with berries and soft fruit will result in the reduction of the berries and fruit to a mashed or mastic condition from the operation of the cooking, evaporating, condensing, concentrating, or reducing treatment, thus dispensing with the prior grinding, crushing, or mashing and a separating or pulping of the berries or fruit.

The finished product of pulped fruit is essentially a solidified fruit and is distinctively compact and non-elastic and is sufficiently hard and firm as it comes from the vacuum pan or kettle to be handled without liability of its spreading out or being injured in handling, the solidified and coherent nature of the product furnishing a sufficient tenacity for the purpose of handling. The product has a degree of solidity, firmness, compactness, and rigidity that causes it to maintain the structure and shape, and at the same time the product is sufficiently flexible to permit of flexing or bending without breaking or cracking to an injurious extent. The product when it comes from the drier is self-preserving in respect to its keeping qualities by reason of the elimination of the moisture therefrom to a point where it is comparatively impervious to atmospheric moisture and below that at which fermentation could possibly take place, making the product fermentation-proof. The finished product has retained therein the flavors and qualities in every essential respect of fresh fruit in its original state after being cooked or stewed, and when treated to prevent decolorization the product will also have retained therein the natural original color of the fruit, and the product is not oxidized, but remains in a healthy natural condition as the result of its production under vacuum, and when wrapped and tightly boxed or cased the product is in a condition for long preservation without deterioration as to its properties, as it will not ferment, is proof against the operation of insects, and cannot become wormy or decayed.

The product of this invention is adapted for manufacturing purposes generally and for the use of preservers, confectioners, bakers, other manufacturers and housekeepers, and can be used as a filling for pastry or for delicacies, or for any purpose for which fruit in the fresh state is used, as it dissolves quickly in water and is readily digestible for use, it being only necessary for most purposes to dissolve in hot water a sufficient amount of the product for the quantity of fruit-pulp or other mixture desired. Where the product is made without the addition of a sweetening or other binder, it is necessary to add the proper amount of sweetening.

The new product of this invention can be made of deciduous, citrous, or other kinds of fruit. It can be made without the addition of a sweetening or binder, or by the use of sugar, glucose, or other sweetening, or some binder from the fiber and juice solids of pulped fruit. It can be made from fully-ripe fruit, or from fruit which is in a condition that would render it impractical to dry or can. The new product of preserved fruit is not a dried, canned, or evaporated fruit, but one in which the fruit is treated so as to eliminate or extract the moisture to a point below that where fermentation could possibly take place, and this without loss of the original flavor and properties of the fruit. The product is of a nature possessing stability and solidity, and at the same time is of a plastic nature and not dry and hard, and yet has the necessary consistency to be handled without injury thereto.

What I claim as new, and desire to secure by Letters Patent, is—

1. A preserved-fruit product made from the fiber and juice solids of pulped fruit having the condition of being solidified compact and coherent with the moisture eliminated therefrom to a point below that of possible fermentation and possessing the characteristics of having retained therein the natural flavor practically of the fruit, of requiring no further cooking to be dissolvable and digestible for use and capable of use as cooked fresh fruit and of being impervious, essentially to atmospheric moisture and climatic changes, substantially as described.

2. A preserved-fruit product made from the fiber and juice solids of pulped fruit and a binder having the condition of being solidified, compact and coherent with the moisture eliminated therefrom to a point below that of possible fermentation and possessing the characteristics of having retained therein the natural flavor practically of the fruit, of requiring no further cooking to be dissolvable and digestible for use and capable of use as cooked fresh fruit, and of being impervious, essentially to atmospheric moisture and climatic changes, substantially as described.

DANIEL F. SHERMAN.

Witnesses:
 OSCAR W. BOND,
 THOMAS B. MCGREGOR.